(12) United States Patent
Hiraoka et al.

(10) Patent No.: US 10,755,854 B2
(45) Date of Patent: Aug. 25, 2020

(54) THIN FILM CAPACITOR

(71) Applicant: TDK Corporation, Minato-ku, Tokyo (JP)

(72) Inventors: Masahiro Hiraoka, Tokyo (JP); Hitoshi Saita, Tokyo (JP); Suguru Andoh, Tokyo (JP); Atsuo Matsutani, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/145,231

(22) Filed: Sep. 28, 2018

(65) Prior Publication Data

US 2019/0103220 A1 Apr. 4, 2019

(30) Foreign Application Priority Data

Sep. 29, 2017 (JP) ................. 2017-191037

(51) Int. Cl.
| | |
|---|---|
| *H01G 4/01* | (2006.01) |
| *H01G 4/12* | (2006.01) |
| *H01G 4/33* | (2006.01) |
| *H01G 4/005* | (2006.01) |
| *H01G 7/06* | (2006.01) |

(52) U.S. Cl.
CPC .............. *H01G 4/01* (2013.01); *H01G 4/005* (2013.01); *H01G 4/1227* (2013.01); *H01G 4/33* (2013.01); *H01G 4/1245* (2013.01); *H01G 7/06* (2013.01)

(58) Field of Classification Search
CPC ........ H01G 4/01; H01G 4/005; H01G 4/1227; H01G 4/33; H01G 4/1245; H01G 4/38; H01G 4/012; H01G 4/30; H01G 4/0085; H01G 4/12; H01G 7/06; H01G 4/232; H01L 21/4857; H01L 21/486; H01L 23/49822; H01L 23/49827; H01L 23/49838

USPC ............................................... 361/303, 321.2
See application file for complete search history.

(56) References Cited

U.S. PATENT DOCUMENTS

| | | | |
|---|---|---|---|
| 2010/0246092 A1* | 9/2010 | Shibue ..................... | H01G 4/33 361/313 |
| 2011/0210362 A1* | 9/2011 | Lee ........................ | H01L 33/382 257/98 |
| 2014/0212576 A1 | 7/2014 | Fujii et al. | |

FOREIGN PATENT DOCUMENTS

| | | |
|---|---|---|
| JP | 2010-232329 A | 10/2010 |
| JP | 2014-144881 A | 8/2014 |

\* cited by examiner

*Primary Examiner* — Michael P McFadden
(74) *Attorney, Agent, or Firm* — Faegre Drinker Biddle & Reath LLP

(57) ABSTRACT

Provided is a thin film capacitor that includes: a first electrode layer having a principal surface in which a plurality of recesses are provided; a dielectric layer laminated on the principal surface of the first electrode layer; and a second electrode layer laminated on the dielectric layer. When a depth of the recess is defined as FL and a thickness of the dielectric layer is defined as T, H/T is 0.05 or more and 0.5 or less.

7 Claims, 4 Drawing Sheets

THIN FILM CAPACITOR

TECHNICAL FIELD

The present invention relates to a thin film capacitor.

BACKGROUND

Thin film capacitors have been under investigation for a long time for the purpose of suppressing a leakage current. For example, a thin film capacitor having a two-layer dielectric thin film formed of a first dielectric layer and a second dielectric layer and a pair of electrodes between which the two layers of the dielectric thin film are interposed and which face each other in parallel is disclosed in Japanese Unexamined Patent Publication No. 2010-232329. In this thin film capacitor, a leakage current is suppressed by numerous voids formed in an interface between the first dielectric layer and the second dielectric layer.

For example, a method of improving a leakage current characteristic of a dielectric the film by doping a composition for forming the dielectric thin film of a thin film capacitor or the like with aluminum (Al) is disclosed in Japanese Unexamined Patent Publication No. 2014-144881.

However, in the thin film capacitor disclosed in Japanese Unexamined Patent Publication No. 2010-232329, since the dielectric layer (the dielectric thin film) is formed of the plurality of layers, a thickness of the dielectric layer is easily increased. For this reason, it is difficult to improve capacitance of the thin film capacitor. Further, in the method of Japanese Unexamined Patent Publication No. 2014-144881, it is difficult to adjust an amount of aluminum (Al) with which the dielectric layer is doped, and to make the dielectric layer thin as well. Therefore, a thin film capacitor capable of suppressing the leakage current while keeping the dielectric layer thin is required.

The present invention was made in view of the above circumstances, and an object thereof is to provide a thin film capacitor capable of suppressing a leakage current while keeping a dielectric layer thin

SUMMARY

A thin film capacitor according to an embodiment of the present invention includes: a first electrode layer having a principal surface in which a plurality of recesses are provided; a dielectric layer laminated on the principal surface of the first electrode layer; and a second electrode layer laminated on the dielectric layer. When a depth of the recess is defined as H, and a thickness of the dielectric layer is defined as T, H/T is 0.05 or more and 0.5 or less.

In the thin film capacitor, the principal surface of the first electrode layer on which the dielectric layer is laminated has the plurality of recesses. When the depth of the recess is defined as H, and the thickness of the dielectric layer is defined as T, H/T is 0.05 or more and 0.5 or less. By providing the plurality of recesses, a distance between the first electrode layer and the second electrode layer is increased in a place where each of the recesses is provided, and a leakage current is hardly generated. Therefore, the leakage current can be suppressed while keeping the dielectric layer thin.

In the embodiment, the plurality of recesses may be dispersed at a rate of 50 or more and 300 or less per 100 $\mu m^2$. By providing the plurality of recesses at this rate, the leakage current can be more effectively suppressed. By dispersing the plurality of recesses approximately uniformly, concentration of the leakage current in a specific place is suppressed. Accordingly, the leakage current can be suppressed in the entire thin film capacitor.

In the embodiment, a plurality of protrusions adjacent to each of the plurality of recesses individually may be further provided on the principal surface of the first electrode layer. According to this configuration, a contact area between the first electrode layer and the dielectric layer is increased, and thus adhesion between the first electrode layer and the dielectric layer can be improved.

In the embodiment, a width of the recess may be 0.05 $\mu m$ or more and 0.3 $\mu m$ or less. According to this configuration, when the dielectric layer is laminated on the first electrode layer, the dielectric layer easily infiltrates into the plurality of recesses. Therefore, the adhesion between the first electrode layer and the dielectric layer can be further improved.

According to the present invention, a thin film capacitor capable of suppressing a leakage current while keeping a dielectric layer thin is provided.

DETAILED DESCRIPTION

Hereinafter, various embodiments will be described with reference to the drawings. In each of the drawings, identical or equivalent parts are given the same reference signs, and duplicate description thereof will be omitted.

Figure 1:
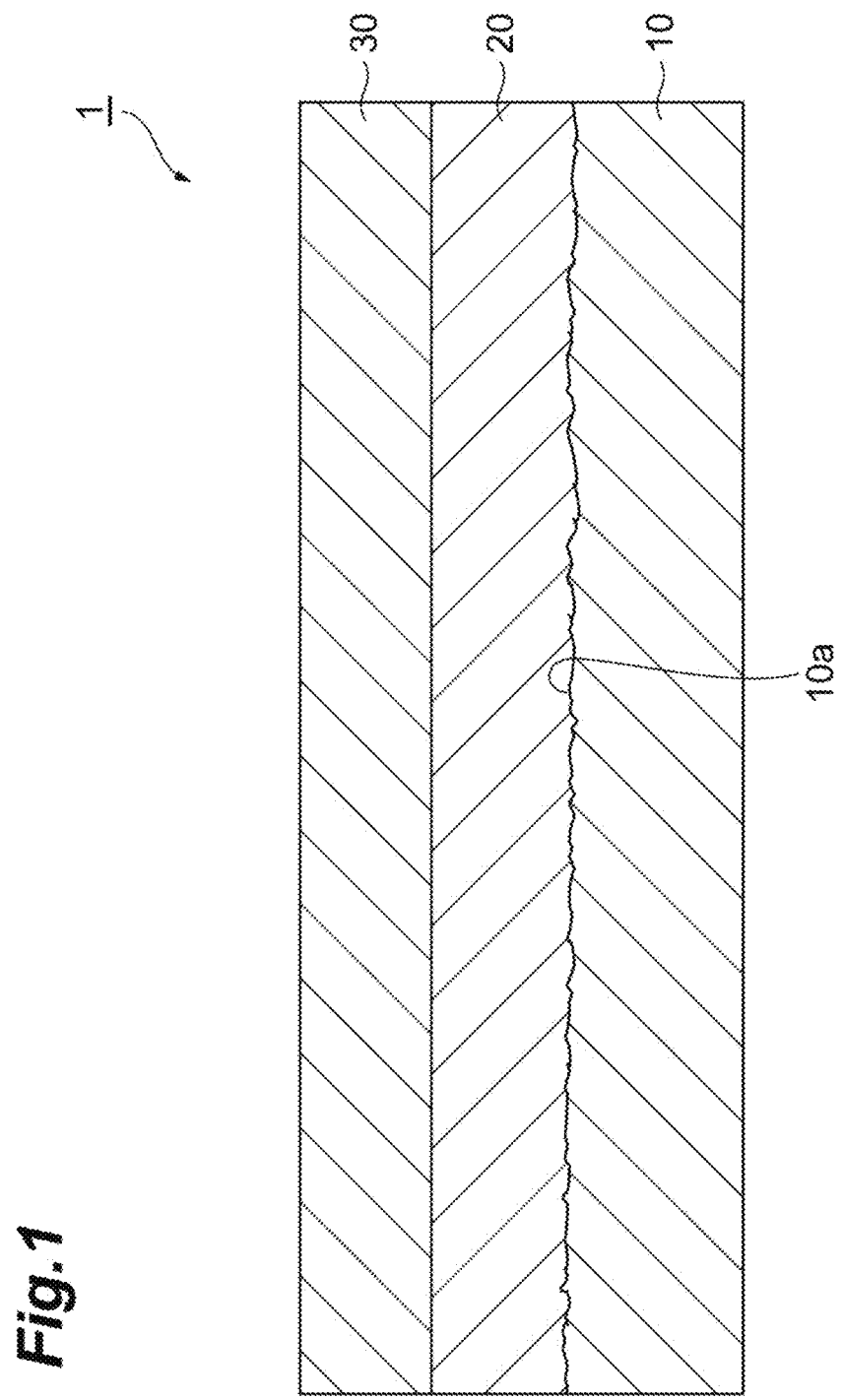
FIG. 1 is a sectional view schematically illustrating a thin film capacitor according to an embodiment of the present invention.

FIG. 1 is a sectional view schematically illustrating a thin film capacitor according to an embodiment of the present invention. The thin film capacitor illustrated in FIG. 1 is a so-called thin film capacitor (TFCP), and is a capacitor that is mounted on a substrate used for, for instance, a communication terminal or the like. As illustrated in FIG. 1, the thin film capacitor 1 includes a first electrode layer 10, a dielectric layer 20, and a second electrode layer 30. The first electrode layer 10 has a principal surface 10a, and the dielectric layer 20 is laminated on the principal surface 10a of the first electrode layer 10. The second electrode layer 30 is laminated on the dielectric layer 20. Thereby, the dielectric layer 20 is interposed between the first electrode layer 10 and the second electrode layer 30.

The first electrode layer 10 and the second electrode layer 30 have a flat panel shape, and are formed of, for instance, a metal thin film. As a material of which the first electrode layer 10 and the second electrode layer 30 are formed, for instance a material whose principal component is nickel (Ni), copper (Cu), aluminum (Al), platinum (Pt), an alloy containing these metals, or an intermetallic compound is preferably used. However, the materials of the first and second electrode layers 10 and 30 are not particularly limited as long as they are conductive materials. "Principal component" means that a percentage of the component is higher than or equal to 50 mass %. As a mode for the first electrode layer 10 and the second electrode layer 30, in addition to a case in which these layers are formed of an alloy or an intermetallic compound, a case in which these layers have a laminate structure formed of two or more kinds is also included. For example, the electrode layers may be formed as a double-layered structure in which a Cu thin film is provided on a Ni thin film. When pure nickel is used for the first electrode layer 10 and the second electrode layer 30, a purity of the nickel is preferably 99.99% or higher. Furthermore, in the case of an alloy containing nickel, a metal contained as a metal other than nickel preferably includes at least one selected from the group consisting of platinum (Pt), palladium (Pd), iridium (Ir), rhodium (Rh), ruthenium (Ru), osmium (Os), rhenium (Re), tungsten (W), chromium (Cr), tantalum (Ta), silver (Ag), and copper (Cu). The first electrode layer 10 and the second electrode layer 30 may be formed of materials identical to each other or materials different from each other.

A thickness of the first electrode layer 10 may be set to, for instance, 0.1 µm to 200 µm. A thickness of the second electrode layer 30 may be set to, for instance, 0.1 µm to 10 µm. The first electrode layer 10 is preferably made of a metal film, and is used as both the substrate and the electrode. In this way, the first electrode layer 10 according to the present embodiment is preferably configured to be used as the substrate. However, a substrate/electrode film structure in which the first electrode layer 10 is provided on the substrate formed of Si or alumina may be adopted.

The dielectric layer 20 is formed of a perovskite-based dielectric material. Here, the perovskite-based dielectric material in the present embodiment includes a (strong) dielectric material having a perovskite structure such as $BaTiO_3$ (barium titanate), $(Ba_{1-x}Sr_x)TiO_3$ (barium strontium titanate), $(Ba_{1-x}Ca_x)TiO_3$, $PbTiO_3$, $Pb(Zr_xTi_{1-x})O_3$, or the like, a composite perovskite relaxer type ferroelectric material typified by $Pb(Mg_{1/3}Nb_{2/3})O_3$, or the like. Here, in the perovskite structure and the perovskite relaxer type dielectric material, a ratio between an A site and a B site is typically an integer ratio, but it may be intentionally shifted from an integer ratio in order to improve characteristics. For characteristic control of the dielectric layer 20, an additive acting as an accessory component may be appropriately contained in the dielectric layer 20. A thickness T of the dielectric layer 20 is for instance no less than 0.1 µm and no more than 1.0 µm. The "thickness T of the dielectric layer 20" is a distance between the first electrode layer 10 (the principal surface 10a) and the second electrode layer 30 in the laminating direction of the thin film capacitor 1.

Figure 2:
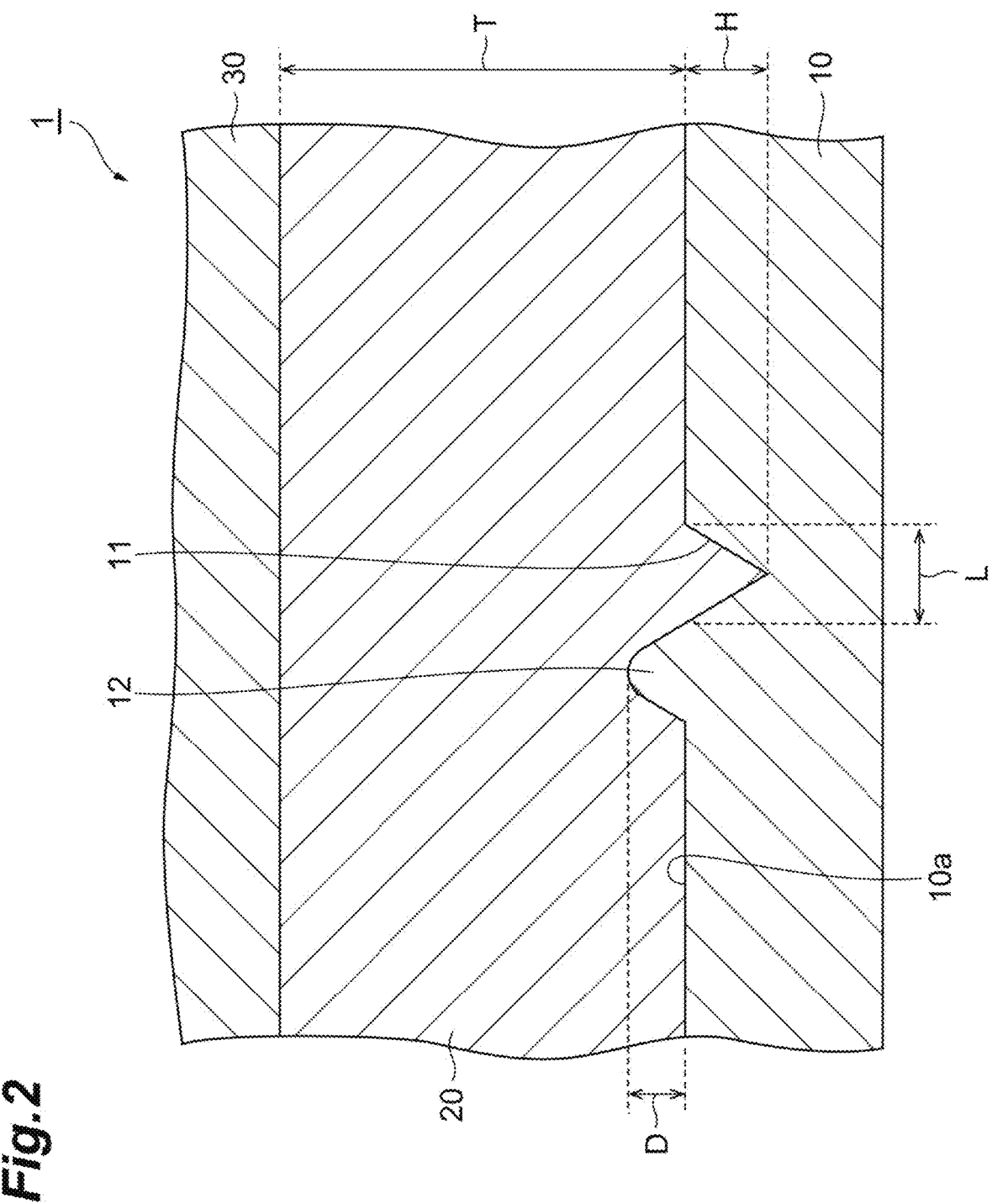
FIG. 2 is an enlarged sectional view illustrating recesses of the thin film capacitor of FIG. 1.

Next, the principal surface 10a of the first electrode layer 10 will be described in detail with reference to FIG. 2. FIG. 2 is an enlarged sectional view illustrating recesses of the thin film capacitor of FIG. 1. As illustrated in FIG. 2, a plurality of recesses 11 and a plurality of protrusions 12 are provided on the principal surface 10a of the first electrode layer 10. Each of the plurality of protrusions 12 are provided adjacent to (adjoining) each of the recesses 11 individually. Here, the state in which the recess 11 and the protrusion 12 "adjacent" to each other indicates a state in which an end of the recess 11 and an end of the protrusion 12 are continuous with each other. In FIG. 2, only one of the recesses 11 and one of the protrusions 12 are enlarged and illustrated. However, the plurality of recesses 11 and the plurality of protrusions 12 are provided throughout the principal surface 10a. To be more specific, the plurality of recesses 11 and protrusions 12 are approximately uniformly dispersed at a rate of 50 or more and 300 or less per 100 µm².

The recess 11 has a shape in which, for instance, the midsection thereof is deepest, and has, for instance, approximately a V shape in a cross section extending in the laminating direction of the thin film capacitor 1. The dielectric layer 20 infiltrates into the recess 11, and the recess 11 is filled with the dielectric layer 20. A depth H of the recess 11 is, for instance, 0.005 µm or more and 0.5 µm or less. A ratio of the depth H of the recess 11 to the thickness T of the dielectric layer 20, that is, a value of H/T, is set to 0.05 or more and 0.5 or less. A width L of the recess 11 is, for instance, 0.05 µm or more and 0.3 µm or less. The "depth H of the recess 11" is a distance from the bottom of the recess 11 to the principal surface 10a of the first electrode layer 10 in the laminating direction. The "width L of the recess 11" is a distance from a place where a dent is started on the basis of the principal surface 10a to a place where the dent comes to an end in a direction perpendicular to the laminating direction. For example, when a lateral surface of the recess 11 and a lateral surface of the protrusion 12 are continuous with each other, a portion close to the first electrode layer 10 based on a region in which the recess 11 and the protrusion 12 are not formed on the principal surface 10a is used as the recess 11, and a portion close to the dielectric layer 20 with respect to the principal surface 10a is used as the protrusion 12.

The protrusion 12 has a shape in which, for instance, the midsection thereof is highest, and has, for instance, a nearly triangular shape in the cross section extending in the laminating direction of the thin film capacitor 1. The top of the protrusion 12 has, for instance, a rounded shape. A height D of the protrusion 12 is, for instance, 0.005 µm or more and 0.05 µm or less. The "height D of the protrusion 12" is a distance from the principal surface 10a of the first electrode layer 10 to the top of the protrusion 12 in the laminating direction.

Next, a method of fabricating the thin film capacitor 1 will be described. First, a metal thin film serving as the first electrode layer 10 is prepared. Next, a surface of the metal thin film is polished. Through this process, the principal surface 10a on which the plurality of recess 11 and the plurality of protrusions 12 are provided is formed. The polishing can be performed using, for instance, free abrasives by moving the metal thin film in one direction while rotating a buff at 1500 to 2300 rpm. It is thought that, during this polishing, the free abrasives scrape the surface of the metal thin film to eat into the metal thin film, and thereby the plurality of recesses 11 are for med. It is thought that the metal thin film scraped by the free abrasives is deformed, and thereby the plurality of protrusions 12 are formed. For this reason, the protrusions 12 tend to be formed to adjacent to the recesses 11 in a constant direction. A particle size of each of the free abrasives used for the polishing may be set to, for instance, about 0.2 µm to 0.4 µm. An average particle size of the free abrasives may be set to, for instance, 0.7 µm. By using the free abrasives, the recesses 11 and the protrusions 12 can be controlled to the aforementioned sizes and shapes. Next, a dielectric film is laminated on the principal surface 10a, and forms the dielectric layer 20. Thereby, the dielectric layer 20 infiltrates into the plurality of recesses 11. Finally, the second electrode layer 30 is laminated on the dielectric layer 20. The second electrode layer 30 can be formed by a well-known method such as DC sputtering.

Figure 3:
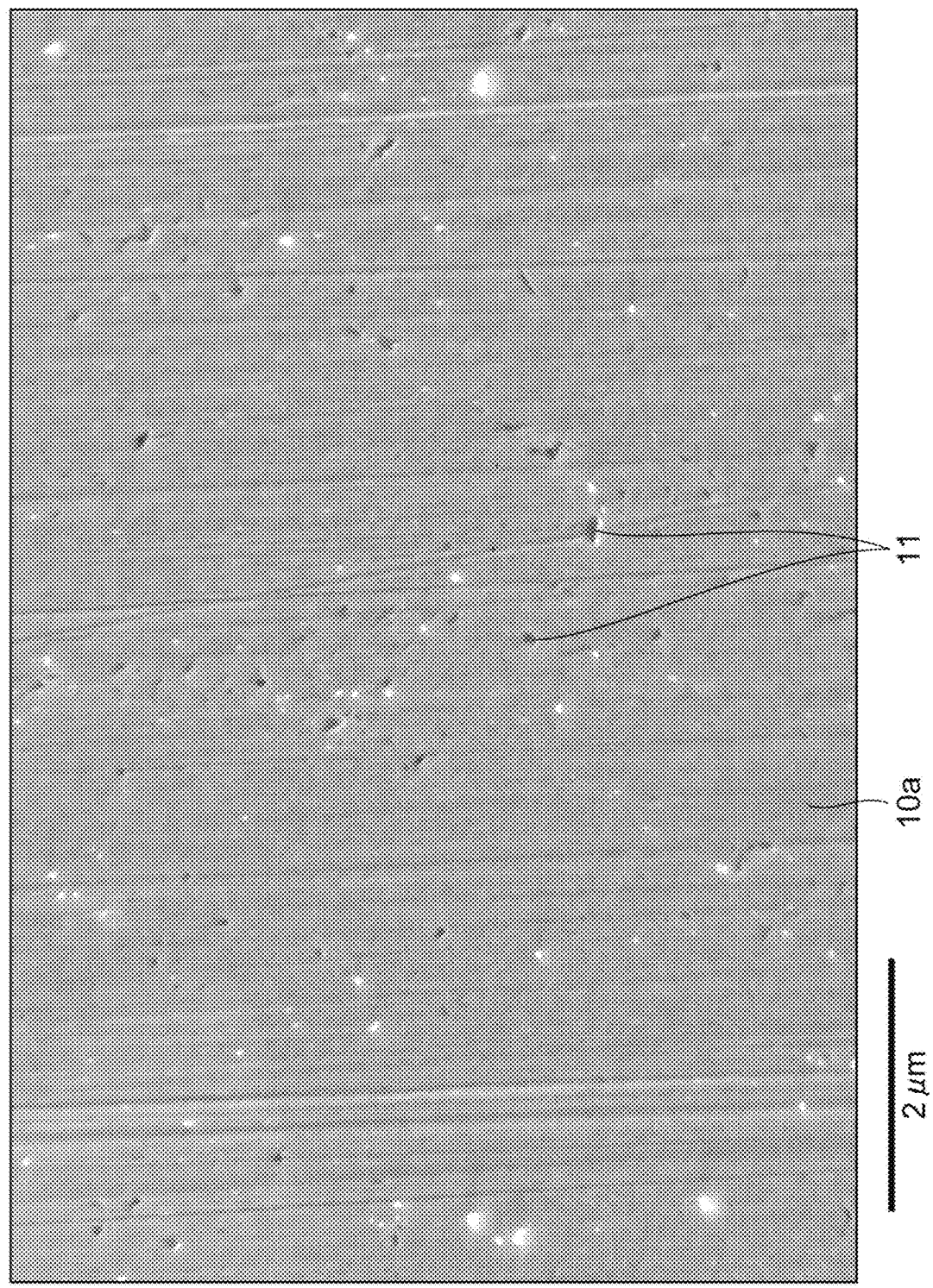
FIG. 3 is an electron microscope image illustrating a principal surface of a first electrode layer of FIG. 1.

FIG. 3 is an electron microscope image illustrating the principal surface 10a of the first electrode layer 10 of FIG. 1. The principal surface 10a of the first electrode layer 10 illustrated in FIG. 3 is formed by polishing the metal thin film of nickel (Ni) using the above method. As illustrated in FIG. 3, it can be confirmed that the plurality of recesses 11 are formed in the principal surface 10a. It can be confirmed that the number of recesses 11 per 100 µm² is about 50 to 300, and the plurality of recesses 11 are approximately uniformly dispersed and formed. Therefore, it can be confirmed that the principal surface 10a having the plurality of recesses that are approximately uniformly dispersed at a rate of 50 or more and 300 or less per 100 μm² is formed.

Figure 4:
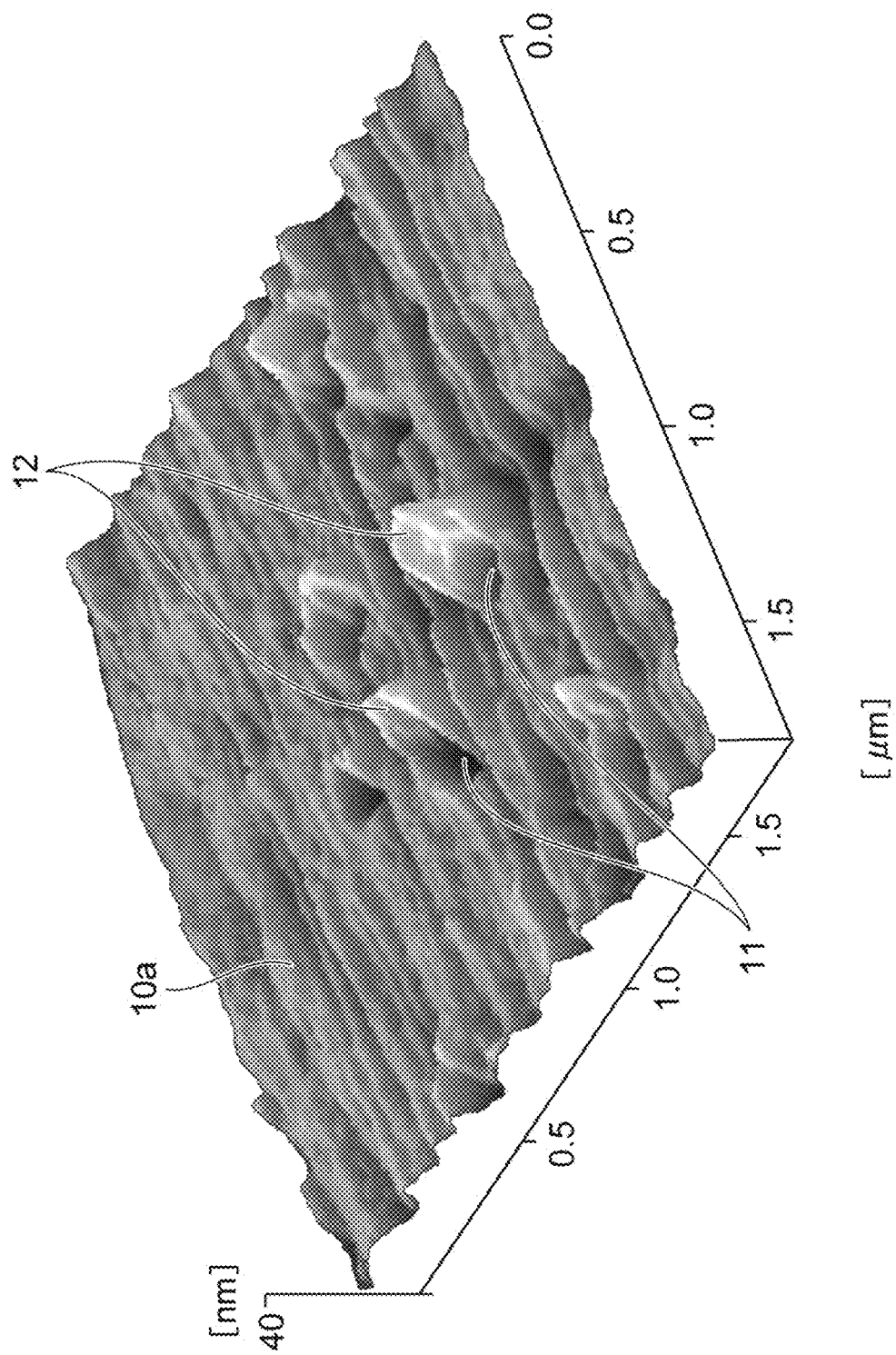
FIG. 4 is an atomic force microscope image illustrating the principal surface of the first electrode layer of FIG. 1.

FIG. 4 is an atomic force microscope image illustrating the principal surface 10a of the first electrode layer 10 of FIG. 1. Like the principal surface 10a illustrated in FIG. 3, the principal surface 10a of the first electrode layer 10 illustrated in FIG. 4 is formed by polishing the metal thin film of nickel (Ni) using the above method. As illustrated in FIG. 4, it can be confirmed that the plurality of recesses 11 and the plurality of protrusions 12 are formed on the principal surface 10a, and the plurality of protrusions 12 adjacent to the recesses 11 different from one another. It can be confirmed that the protrusions 12 are formed to adjacent to the recesses 11 in the constant direction.

As described above, in the thin film capacitor 1 according to the present embodiment, the principal surface 10a of the first electrode layer 10 on which the dielectric layer 20 is laminated has the plurality of recesses 11. When the depth of the recess 11 is defined as H, and the thickness of the dielectric layer 20 is defined as T, H/T is 0.05 or more and 0.5 or less. In this way, the plurality of recesses 11 in which the value of H/T is 0.05 or more and 0.5 or less are provided. Thereby, a distance between the first electrode layer 10 and the second electrode layer 30 is increased in the place where each of the recesses 11 is provided, and a leakage current is hardly generated. Therefore, the leakage current can be suppressed while keeping the dielectric layer 20 thin.

When the value of H/T is less than 0.05, that is, when the depth H of the recess 11 is too small compared to the thickness T of the dielectric layer 20, a change in the distance between the first electrode layer 10 and the second electrode layer 30 by providing the recesses 11 is small. For this reason, an effect of suppressing the leakage current may not be sufficiently obtained. In contrast, when the value of H/T exceeds 0.5, that is, when the depth H of the recess 11 is too large compared to the thickness T of the dielectric layer 20, an amount of decrease in capacitance in the places where the recesses 11 are formed increases. Since there is a need to increase the thickness of the first electrode layer 10, it is difficult to reduce the thickness of the entire thin film capacitor 1. Accordingly, the value of H/T is set to 0.05 or more and 0.5 or less, and thereby the leakage current can be effectively suppressed while maintaining the size and capacitance of the thin film capacitor 1.

The plurality of recesses 11 are dispersed at the rate of 50 or more and 300 or less per 100 μm². As the plurality of recesses 11 are provided at this rate, the leakage current can be more effectively suppressed. The plurality of recesses 11 are approximately uniformly dispersed, and thereby concentration of the leakage current in a specific place is suppressed. Accordingly, the leakage current can be suppressed in the entire thin film capacitor. As the concentration of the leakage current into the specific place is suppressed, occurrence of breakdown of the dielectric layer 20 caused by, for instance, electrostatic discharge (ESD) can be suppressed. The plurality of protrusions 12 adjacent to each of the plurality of recesses 11 individually are further provided on the principal surface 10a of the first electrode layer 10. Thereby, the distance between the first electrode layer 10 and the second electrode layer 30 is reduced in a place where each of the protrusions 12 is provided, and thus each of the protrusions 12 functions as a leakage point at which a minute leakage current is easily generated. Thereby, when a big leakage current is generated by, for instance, ESD, the leakage current is dispersed to a plurality of leakage points, and thus the concentration of the leakage current in a specific place and the occurrence of breakdown can be suppressed. Since a contact area between the first electrode layer 10 and the dielectric layer 20 is increased, adhesion between the first electrode layer 10 and the dielectric layer 20 can be improved. Accordingly, for example, even when the thin film capacitor 1 is operated under high-frequency conditions, deformation can be inhibited from occurring on the interface between the first electrode layer 10 and the dielectric layer 20 due to an influence of a high frequency. Therefore, during the high-frequency operation, the plurality of protrusions 12 can be made to function as the leakage points.

The width L of the recesses 11 is 0.05 μm or more and 0.3 μm or less. Thereby, when the dielectric layer 20 is laminated on the first electrode layer 10, the dielectric layer 20 easily infiltrates into the plurality of recesses 11. Therefore, the adhesion between the first electrode layer 10 and the dielectric layer 20 can be further improved.

While an embodiment of the present invention has been described, the present invention is not limited to the above embodiment, and can be modified in various ways. For example, in the above embodiment, the example in which the protrusions 12 are provided to adjacent to the recesses 11 has been described, but the protrusions 12 and the recesses 11 may not adjacent to each other.

In the above embodiment, the example in which the plurality of protrusions 12 are provided on each of the plurality of recesses 11 individually has been described, but the protrusion 12 may not be provided on all the recesses 11. That is, the number of recesses 11 and the number of protrusions 12 may be different from each other. Furthermore, no protrusions 12 may be provided on the principal surface 10a.

In the above embodiment, the example in which, in the cross section extending in the laminating direction of the thin film capacitor 1, the shape of the recesses 11 is the approximate V shape, and the shape of the protrusion 12 is the approximately triangular shape has been described, but the shapes of the recess 11 and the protrusion 12 are not limited thereto.

In the above embodiment, the example in which the dielectric layer 20 infiltrates into the recesses 11, and the recesses 11 are filled with the dielectric layer 20 has been described, but the recesses 11 may not be filled with the dielectric layer 20. Alternatively, the recesses 11 may be filled with a material different from that of the dielectric layer 20. For example, the recesses 11 may be filled with $Al_2O_3$, $SiN_x$, ZrO, SiC, or BN. The dielectric layer 20 may not infiltrate into the recesses 11.

In the above embodiment, a so-called single layered thin film capacitor in which the dielectric layer 20 is one layer has been described. However, the structure described in the above embodiment can also be applied to a so-called multilayered thin film capacitor having a plurality of dielectric layers interposed between a pair of electrode layers.

What is claimed is:
1. A thin film capacitor comprising:
a first electrode layer having a principal surface in which a plurality of recesses are provided;
a dielectric layer laminated on the principal surface of the first electrode layer; and
a second electrode layer laminated on the dielectric layer,
wherein, when a depth of the recess is defined as H, and a thickness of the dielectric layer is defined as T, H/T is 0.05 or more and 0.5 or less, the plurality of recesses are uniformly distributed throughout the principal surface of the first electrode layer;
a plurality of protrusions are provided on the principal surface of the first electrode layer,
each of the protrusions is provided adjacent to a corresponding one of the recesses, and
the protrusions are provided adjacent to the recesses in a substantially constant direction.

2. The thin film capacitor according to claim 1, wherein the plurality of recesses are dispersed at a rate of 50 or more and 300 or less per 100 $\mu m^2$.

3. The thin film capacitor according to claim 2, wherein a width of the recess is 0.05 $\mu m$ or more and 0.3 $\mu m$ or less.

4. The thin film capacitor according to claim 1, wherein a width of the recess is 0.05 $\mu m$ or more and 0.3 $\mu m$ or less.

5. The thin film capacitor according to claim 1, wherein a lateral surface of each recess is continuous with a lateral surface of the corresponding protrusion.

6. The thin film capacitor according to claim 1, wherein each recess has a substantially V-shape in a cross-section extending in a laminating direction of the thin film capacitor.

7. The thin film capacitor according to claim 1, wherein each protrusion has a substantially triangular shape in a cross-section extending in a laminating direction of the thin film capacitor.

* * * * *